United States Patent
Rao

(10) Patent No.: US 9,674,053 B2
(45) Date of Patent: Jun. 6, 2017

(54) AUTOMATIC TARGET SELECTION

(71) Applicant: Gigamon Inc., Santa Clara, CA (US)

(72) Inventor: Anil Rao, Santa Clara, CA (US)

(73) Assignee: Gigamon Inc., Santa Clara, CA (US)

( * ) Notice: Subject to any disclaimer, the term of this patent is extended or adjusted under 35 U.S.C. 154(b) by 148 days.

(21) Appl. No.: 14/610,595

(22) Filed: Jan. 30, 2015

(65) Prior Publication Data

US 2016/0226726 A1 Aug. 4, 2016

(51) Int. Cl.
*H04W 4/00* (2009.01)
*H04L 12/26* (2006.01)
*H04L 29/06* (2006.01)

(52) U.S. Cl.
CPC .......... *H04L 43/028* (2013.01); *H04L 43/062* (2013.01); *H04L 63/145* (2013.01)

(58) Field of Classification Search
CPC ............................ H04L 43/028; H04L 43/062
USPC ...................................................... 370/392
See application file for complete search history.

(56) References Cited

U.S. PATENT DOCUMENTS

| | | | | |
|---|---|---|---|---|
| 2008/0109902 A1* | 5/2008 | Grosse | ............. | H04L 63/145 726/22 |
| 2008/0109905 A1* | 5/2008 | Grosse | ............. | H04L 63/1458 726/23 |
| 2009/0245128 A1* | 10/2009 | Matityahu | ............. | H04L 43/12 370/252 |
| 2009/0328210 A1* | 12/2009 | Khachaturov | ............. | G06F 21/552 726/22 |
| 2010/0325588 A1* | 12/2010 | Reddy | ............. | G06F 3/048 715/853 |
| 2012/0317566 A1* | 12/2012 | Santos | ............. | G06F 9/45558 718/1 |
| 2013/0174256 A1* | 7/2013 | Powers | ............. | H04L 63/1416 726/23 |

* cited by examiner

*Primary Examiner* — Farah Faroul
(74) *Attorney, Agent, or Firm* — Perkins Coie LLP

(57) ABSTRACT

A method of identifying targets for monitoring includes: obtaining a user-defined filter map, the user-defined filter map having one or more filter rules for matching against network traffic when the user-defined filter map is used by a network system to process the network traffic; and determining a set of one or more targets by a processing unit based at least in part on the user-defined filter map, wherein the processing unit comprises a target selection module configured to access a list of available targets from a database, and select the one or more targets from the list of available targets based at least in part on the user-defined filter map.

28 Claims, 6 Drawing Sheets

Example

User specified filters: IP_src = 172.26.0.0/16, IP_dst = *
IP_src = IP_dst = 172.26.0.0/16

Inclusion Set: $I = \{172.16.1.0/24, 172.26.1.0/24, 172.26.2.0/24\}$
Exclusion Set: $E = \{172.26.1.2, 172.26.1.3\}$ $V = \{172.0.0.0/8\}$
$F = \{172.26.0.0/16\}$ $T = (F \cap I) - E$
$= \{172.26.1.1, 172.26.1.4, 172.26.2.1, 172.26.2.2, 172.26.2.3\}$

AUTOMATIC TARGET SELECTION

FIELD

This application relates generally to network traffic monitoring, and more specifically, to systems and methods for network traffic monitoring.

BACKGROUND

For network traffic monitoring, a user may need to identify certain targets. A target in this context is a network component for which the network monitoring is performed. For example, if a user wants to monitor network traffic going to a certain target, then the user may identify such target in the monitoring session. The task performed by the user to identify every target that needs to be monitored may become tedious, especially when there is a very large number of potential targets. Also, such a task may need to be repeated every time a new rule or a new map is created. In addition, if new targets of interest appear in the monitoring domain, they may need to be manually identified by the user, so that the user can associate the new targets with the map, before these new targets can be monitored.

SUMMARY

A method of identifying targets for monitoring includes: obtaining a user-defined filter map, the user-defined filter map having one or more filter rules for matching against network traffic when the user-defined filter map is used by a network system to process the network traffic; and determining a set of one or more targets by a processing unit based at least in part on the user-defined filter map, wherein the processing unit comprises a target selection module configured to access a list of available targets from a database, and select the one or more targets from the list of available targets based at least in part on the user-defined filter map.

Optionally, the target selection module is configured to select the one or more targets from the list of available targets based on:

$$C = \begin{cases} \text{subset of } V \text{ associated with } L1-L3 \\ \text{filter component (if specified)} \\ V \end{cases},$$

$$R = \bigcap_{i=1}^{m} C_i,$$

and $$F = \bigcup_{j=1}^{n} R_j$$

wherein V represents the set of available targets, R represents a target set for a rule comprising m filter components, and F represents a target set for a map having n rules.

Optionally, the target selection module is configured to select the one or more targets from the list of available targets also based on an inclusion set I defined as:

$$I = \begin{cases} \text{targets to be included (if specified)} \\ V \text{(otherwise)} \end{cases}$$

Optionally, the target selection module is configured to select the one or more targets from the list of available targets also based on an exclusion set E defined as:

$$E = \begin{cases} \text{targets to be excluded (if specified)} \\ \emptyset \text{(otherwise)} \end{cases}$$

Optionally, the one or more targets constitute a target set T defined as $$T=(F \cap I)-E.$$

Optionally, the targets comprise a virtual machine (VM).

Optionally, the targets comprise a vNIC.

Optionally, the act of determining the set of one or more targets comprises determining a first set of targets that are possible source(s) and/or recipient(s) of packets satisfying any of the one or more filter rules in the user-defined filter map.

Optionally, the user-defined filter map comprises a first filter rule having first multiple filter components, and wherein the act of determining the set of one or more targets comprises determining a first set of targets by the processing unit that are possible source(s) and/or recipient(s) of packets satisfying all of the first multiple filter components of the first filter rule.

Optionally, the user-defined filter map comprises a second filter rule having second multiple filter components, and wherein the act of determining the set of one or more targets further comprises determining a second set of targets by the processing unit that are possible source(s) and/or recipient(s) of packets satisfying all of the second multiple filter components of the second filter rule.

Optionally, the method further includes: obtaining information regarding an inclusion set; and determining a second set of targets based on the information regarding the inclusion set; wherein the set of one or more targets is determined based on: (the first set of targets)∩(the second set of targets).

Optionally, the method further includes: obtaining information regarding an exclusion set; and determining a third set of targets based on the information regarding the exclusion set; wherein the set of one or more targets is determined based on: ((the first set of targets)∩(the second set of targets))−(the third set of targets).

Optionally, the obtained user-defined filter map comprises a newly created filter rule, and the act of determining the set of one or more targets is performed by the processing unit in response to the newly created filter rule.

Optionally, the obtained user-defined filter map comprises a modified filter rule resulted from a modification of an existing filter rule, and the act of determining the set of one or more targets is performed by the processing unit in response to the modified filter rule.

Optionally, one of the one or more filter rules comprises one or more filter components, the one or more filter components comprising information regarding a switch port, a MAC address, a VLAN identifier, an ethertype, an IP address, a wildcard, or any combination of the foregoing.

An apparatus for identifying targets for monitoring includes: a non-transitory medium for storing a user-defined filter map, the user-defined filter map having one or more filter rules for matching against network traffic when the user-defined filter map is used by a network system to process the network traffic; and a processing unit configured for determining a set of one or more targets based at least in part on the user-defined filter map; wherein the processing unit comprises a target selection module configured to determine the set of one or more targets by accessing a list of available targets from a database, and selecting the one or more targets from the list of available targets based at least in part on the user-defined filter map.

Optionally, the target selection module is configured to select the one or more targets from the list of available targets based on:

$$C = \begin{cases} \text{subset of } V \text{ associated with } L1 - L3 \\ \text{filter component (if specified)} \\ V \end{cases},$$

$$R = \bigcap_{i=1}^{m} C_i,$$

and $$F = \bigcup_{j=1}^{n} R_j$$

wherein V represents the set of available targets, R represents a target set for a rule comprising m filter components, and F represents a target set for a map having n rules.

Optionally, the target selection module is configured to select the one or more targets from the list of available targets also based on an inclusion set I defined as:

$$I = \begin{cases} \text{targets to be included (if specified)} \\ V \text{(otherwise)} \end{cases}$$

Optionally, the target selection module is configured to select the one or more targets from the list of available targets also based on an exclusion set E defined as:

$$E = \begin{cases} \text{targets to be excluded (if specified)} \\ \emptyset \text{(otherwise)} \end{cases}$$

Optionally, the one or more targets constitute a target set T defined as $T=(F \cap I)-E.$ Optionally, the targets comprise a virtual machine (VM).

Optionally, the targets comprise a vNIC.

Optionally, the processing unit is configured for determining the set of one or more targets by determining a first set of targets that are possible source(s) and/or recipient(s) of packets satisfying any of the one or more filter rules in the user-defined filter map.

Optionally, the user-defined filter map comprises a first filter rule having first multiple filter components, and wherein the processing unit is configured for determining the set of one or more targets by determining a first set of targets by the processing unit that are possible source(s) and/or recipient(s) of packets satisfying all of the first multiple filter components of the first filter rule.

Optionally, the user-defined filter map comprises a second filter rule having second multiple filter components, and wherein the processing unit is configured for determining the set of one or more targets further by determining a second set of targets by the processing unit that are possible source(s) and/or recipient(s) of packets satisfying all of the second multiple filter components of the second filter rule.

Optionally, the processing unit is further configured for: obtaining information regarding an inclusion set; and determining a second set of targets based on the information regarding the inclusion set; wherein the processing unit is configured to determine the set of one or more targets based on: (the first set of targets)∩(the second set of targets).

Optionally, the processing unit is further configured for: obtaining information regarding an exclusion set; and determining a third set of targets based on the information regarding the exclusion set; wherein the processing unit is configured to determine the set of one or more targets based on: ((the first set of targets)∩(the second set of targets))−(the third set of targets).

Optionally, the obtained user-defined filter map comprises a newly created filter rule, and the processing unit is configure for determining the set of one or more targets in response to the newly created filter rule.

Optionally, the obtained user-defined filter map comprises a modified filter rule resulted from a modification of an existing filter rule, and the processing unit is configured for determining the set of one or more targets in response to the modified filter rule.

Optionally, one of the one or more filter rules comprises one or more filter components, the one or more filter components comprising information regarding a switch port, a MAC address, a VLAN identifier, an ethertype, an IP address, a wildcard, or any combination of the foregoing.

An apparatus includes a non-transitory medium storing a set of instructions, an execution of which by a processing unit causes a method of identifying targets for monitoring to be performed, the method comprising: obtaining a user-defined filter map, the user-defined filter map having one or more filter rules for matching against network traffic when the user-defined filter map is used by a network system to process the network traffic; and determining a set of one or more targets by the processing unit based at least in part on the user-defined filter map, wherein the processing unit comprises a target selection module configured to access a list of available targets from a database, and select the one or more targets from the list of available targets based at least in part on the user-defined filter map.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DESCRIPTION OF THE EMBODIMENTS

Figure 1:
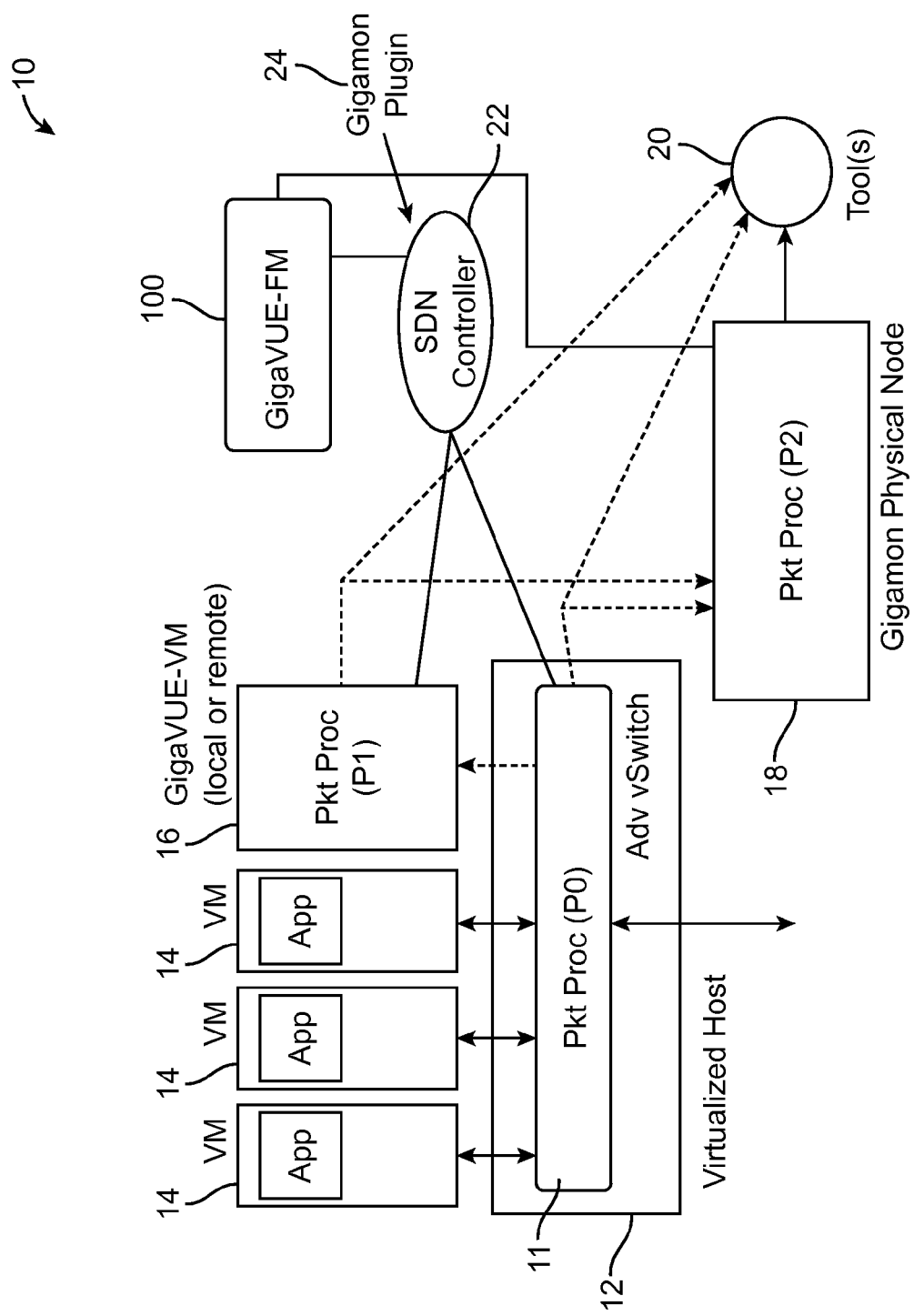
FIG. 1 illustrates a network in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or not so explicitly described.

General Description

Virtual machine (VM) traffic monitoring requires an end-user to perform the following tasks as part of the workflow for initiating a monitoring session: (1) Identify targets desired to be monitored, (2) Define filters, and (3) Specify actions.

A target in this context may be a VM or a virtual network interface card (vNIC) belonging to a VM. A target may be a source of packets, or a recipient of packets. User-defined filters may be expressed as rules in a map. A rule specifies filter components (e.g., L1, L2, L3, L4) that must be satisfied simultaneously. A map is a collection of one or more rules and some associated actions, which get executed whenever any rule in the map has a match. Typical actions involve packet manipulation (e.g. truncation), forwarding (e.g. tunnel to specified destination), packet dropping, or any combination of the foregoing.

Automatic Target Selection (ATS) simplifies the user workflow by eliminating the first step. In ATS, the targets to be monitored are inferred from the specified filters. The user, however, has the option to guide the selection process, if necessary.

An ATS algorithm will now be described. In the ATS algorithm, targets are inferred from filters. In particular, ATS is based on the idea that only those targets whose ingress/egress traffic can potentially result in a match with the user-defined filters need to be monitored (while the remaining targets can be safely ignored). The target selection process therefore involves deriving the set of all such targets for a given map and is carried out as follows.

1. A filter component set C is created for each of the m supported L1-L3 filter components.

$$C = \begin{cases} \text{subset of } V \text{ associated with } L1 - L3 \\ \text{filter component (if specified)} \\ V \end{cases},$$

wherein V denotes the universal set (which consists of all targets within the monitoring domain that are currently listed in the inventory). Thus, the filter component set C represents a subset of the available targets that satisfies a certain filter component if the filter component is specified by a user.

Only local L1-L3 filter components are considered when looking for subsets of V because remote filter components are not associated with the (local) monitoring domain. Also, L4 filter components are ignored as they do not help in identifying targets. Here are some examples of the filter components that may be considered:
L1—Switch port
L2—MAC address, VLAN id, ethertype
L3—IP address 2. Since all the filter components in a rule must be satisfied simultaneously, the filter set R for a rule is given by:

$$R = \bigcap_{i=1}^{m} C_i.$$

In the above equation, "∩" is an intersection function. Note that the intersection of A and B, denoted A∩B, is the set of all items that are members of both A and B. Thu, the filter set R represents a set of targets that satisfy all of the filter components in a certain rule.

3. Because a map is considered to have a match if any of its rules has a match, the filter set F for a map with n rules is given by:

$$F = \bigcup_{j=1}^{n} R_j$$

In the above equation, "∪" is an union function. Note that the union of A and B, denoted A∪B, is the set of all items that are members of either A or B.

In some embodiments, the ATS may allow the user to guide the target selection process, if necessary, by creating special inclusion and/or exclusion sets.

The inclusion set contains only those targets that should be considered by ATS. The user can define it by identifying specific targets or by using an appropriate filter.

Inclusion sets may be saved in a library (e.g., a non-transitory medium) for later use. The inclusion set I may be defined as follows:

$$I = \begin{cases} \text{targets to be included (if specified)} \\ V (\text{otherwise}) \end{cases}$$

The exclusion set contains targets that should not be considered by ATS. The user can define it by identifying specific targets or by using an appropriate filter. Exclusions sets may be saved in a library (e.g., a non-transitory medium) for later use. The exclusion set E may be defined as follows:

$$E = \begin{cases} \text{targets to be excluded (if specified)} \\ \emptyset (\text{otherwise}) \end{cases}$$

wherein ∅ denotes the empty set.

The (final) target set for a map is based on its filter set and appropriate inclusion set I and exclusion set E, as follows:

$$T = (F \cap I) - E$$

In the above equation, "−" is a difference function. Note that the difference of A and B, denoted A−B, is the set of all items that are members of A but not members of B.

The ATS algorithm may be re-run whenever the inventory of targets is updated. This allows addition of new target(s) and/or changes in the existing target(s) be detected.

ATS can overcome the following disadvantages associated with manual selection of targets. The manual selection process to select targets can be tedious, especially when dealing with a very large number of potential targets. The manual selection technique will require a user to manually repeat the process every time a new map is created. Also, when new targets of interest appear in the monitoring domain, they have to be manually identified by the user and associated with a map, before they can be monitored.

One advantage of the manual target selection process is that the user has complete control over target selection. However, ATS can adequately match this capability because it allows the user to guide the selection process, if necessary.

Furthermore, ATS offers the following advantages. The selection process ensures that only the relevant targets (whose ingress/egress network traffic can potentially match rules in the map) are selected for monitoring. In the case where the user supplied inclusion and/or exclusion sets are incompatible with the filter set derived from the map, the system can flag a warning. In the manual target selection schemes, such incompatibilities cannot be easily detected.

DETAILED DESCRIPTION

Before ATS is described, an example of the network environment in which the ATS may be implemented/used is first described. As discussed, ATS may be employed to determine targets for network traffic monitoring. Network traffic in a network is transmitted from a sender for an intended recipient through a traffic production network. VM traffic monitoring involves capturing packets from the traffic production network (e.g., packets entering and/or leaving VMs) and delivering them to appropriate tools for analysis. One way to achieve this, without adversely affecting VM traffic patterns in the traffic production network, is to mirror packets associated with certain VMs to an out-of-band network where they can be processed and eventually forwarded to the respective tools that perform analysis to monitor network traffic. In accordance with some embodiments, an auxiliary network is provided for this purpose. This auxiliary network (called "Software Defined Visibility Fabric") is a policy driven network of chained service nodes. Each service node represents a packet processing station that can filter, manipulate and dispatch network packets. The auxiliary network is built by linking these service nodes together, e.g., using IP tunnels such as GRE, VxLAN, etc. The ATS described herein may be employed to determine targets for the auxiliary network for network traffic monitoring.

FIG. 1 illustrates a network 10 in accordance with some embodiments. The network 10 is an auxiliary network that is implemented to capture packets from a traffic production network. As shown in the figure, the auxiliary network 10 includes a virtual switch 11 implemented in a host 12, and a virtual machine (VM) 16 supported by the host 12. In the illustrated example, the host 12 that implements the virtual switch 11 is also the same host that supports the VM 16. In other examples, there may be one host 12 implementing the virtual switch 11, and another host 12 supporting the VM 16. As shown in the figure, the host 12 also supports multiple virtual machines VMs 14, but the VMs 14 are not a part of the auxiliary network. The network 10 also includes a physical network device 18 communicatively coupled to the host 12 and/or the VM 16. The network device 18 is configured to communicate with one or more tools 20. In some cases, each tool 20 may be a network monitoring tool configured to analyze packets for network monitoring. In other cases, each tool 20 may be any of other types of packet processing tools. The VMs 14 may be configured to run different applications to process packets and/or to perform other types of tasks. The VM 16 is configured to perform packet processing to pass packets downstream for analysis by the tool(s) 20. As shown in the figure, a Software Defined Networking (SDN) controller 22 may be configured to control the behavior of the virtual switch 11 and the VM 16.

The VM 16 and the network device 18 are parts of an auxiliary network configured to obtain packets from a production network, and to pass the packets to the tool(s) 20 for analysis. Thus, the VM 16 and the network device 18 are not parts of the production network. The virtual switch 11 is special because it can straddle the boundary between the production network and the auxiliary network. Thus, it is a part of the production network. If the virtual switch is used as a P0 node by the visibility fabric, then it is also a part of the auxiliary network. Not all virtual switches may be used as a P0 node. However, those that meet certain criteria of a visibility fabric service node (e.g., those that are capable of filtering, manipulation, and forwarding packets) can be used as a P0 node.

In the illustrated embodiments, the virtual switch 11, the VM 16, and the network device 18 are respective service nodes P0, P1, P2, each offering varying levels of capability, as follow:

P0 Node Host-level (advanced) virtual switch 11 (lowest capability)
P1 Node Virtual monitoring appliance 16 (intermediate capability)
P2 Node Physical monitoring appliance 18 (highest capability)

In particular, each service node is capable of providing some degree of packet filtering, packet manipulating, and packet forwarding services. The P0 service node provides the lowest degree of packet filtering, packet manipulating, and packet forwarding services. The P1 service node provides an intermediate degree of packet filtering, packet manipulating, and packet forwarding services. The P2 service node provides the highest degree of packet filtering, packet manipulating, and packet forwarding services.

The P0 nodes straddle the boundary between a traffic production network (where normal network traffic, such as VM traffic, is flowing) and the auxiliary network (Software Defined Visibility Fabric). Their use helps eliminate unwanted traffic closer to the VMs being monitored, thereby freeing up precious bandwidth and reducing processing cycles consumed by other nodes. The P1 nodes may aggregate traffic originating from several P0 and P1 nodes, and offer some advanced packet manipulation capabilities. Similarly, P2 nodes may aggregate traffic from several P0, P1 and P2 nodes and provide the highest levels of capacity, performance and packet manipulation capabilities. In some cases, the auxiliary network may also include P3 node representing a tool 20.

The network device 18 is configured to receive packets, and pass the packets to one or more tools 20. In some cases, the network device 18 may be configured to receive normal packets (e.g., packets not from a virtualized network), as well as virtualized packets (e.g., packets with tunnel format that includes encapsulation of the original packets resulted from virtualization technology). In other cases, the network device 18 may be configured to receive only virtualized packets. Also, in some cases, the network device 18 may be any switch module that provides packet transmission in accordance with a pre-determined transmission scheme. In some embodiments, the network device 18 may be user-configurable such that packets may be transmitted in a one-to-one configuration (i.e., from one network port to an instrument port). As used in this specification, the term "instrument port" refers to any port that is configured to transmit packets to a tool (e.g., tool 20), wherein the tool may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc., or the tool may be a pass-through device (i.e., it can receive packets, and transmit the packets back to the device 100 after the packets have been processed), such as an intrusion prevention system. In other embodiments, the network device 18 may be configured such that the packets may be transmitted in a one-to-many configuration (i.e., from one network port to multiple instrument ports). In other embodiments, the network device 18 may be configured such that the packets may be transmitted in a many-to-many configuration (i.e., from multiple network ports to multiple instrument ports). In further embodiments, the network device 18 may be configured such that the packets may be transmitted in a many-to-one configuration (i.e., from multiple network ports to one instrument port). In some embodiments, the one-to-one, one-to-many, many-to-many, and many-to-one configurations are all available for allowing a user to selectively configure the network device 18 so that the packets (or certain types of packets) are routed according to any one of these configurations. Also, in some embodiments, the network device 18 may be an "out-of-band" network device, which is configured to obtain packets and pass them to a tool or to a network that is different from that associated with the original intended destination of the packets. Thus, the network device 18 is not a part of the underlying network that performs packet production.

As shown in the figure, a fabric manager 100 may be provided, that is configured to communicate with the SDN controller 22 and the network device 18. In some cases, the fabric manager 100 may integrate with the SDN controller 22 through a plug-in 24. For example, in some cases, in a SDN enabled datacenter supporting virtualized workloads, the host-level virtual switches 11 may be under the control of the SDN controller 22. Since these switches 11 serve as service nodes in the SDN fabric, the fabric manager 100 may be integrated with the SDN controller 22 using the plug-in 24. The upper-half of the plug-in 24 may export an API that is specifically designed to satisfy the needs of the fabric manager 100. The lower-half of the plug-in 24 may be controller specific (e.g., different lower-halves of the plug-in 24 may be implemented for different controllers). In such an environment, it is possible for the fabric manager 100 to also manage the VMs 16 and the network devices 18 using the SDN controller 22, provided they are compatible with the controller's 22 Control-Data-Plane-Interface. If not, the fabric manager 100 may directly manage the VMs 16 and the network devices 18. In other cases, the plug-in 24 may not be needed.

Figure 2:
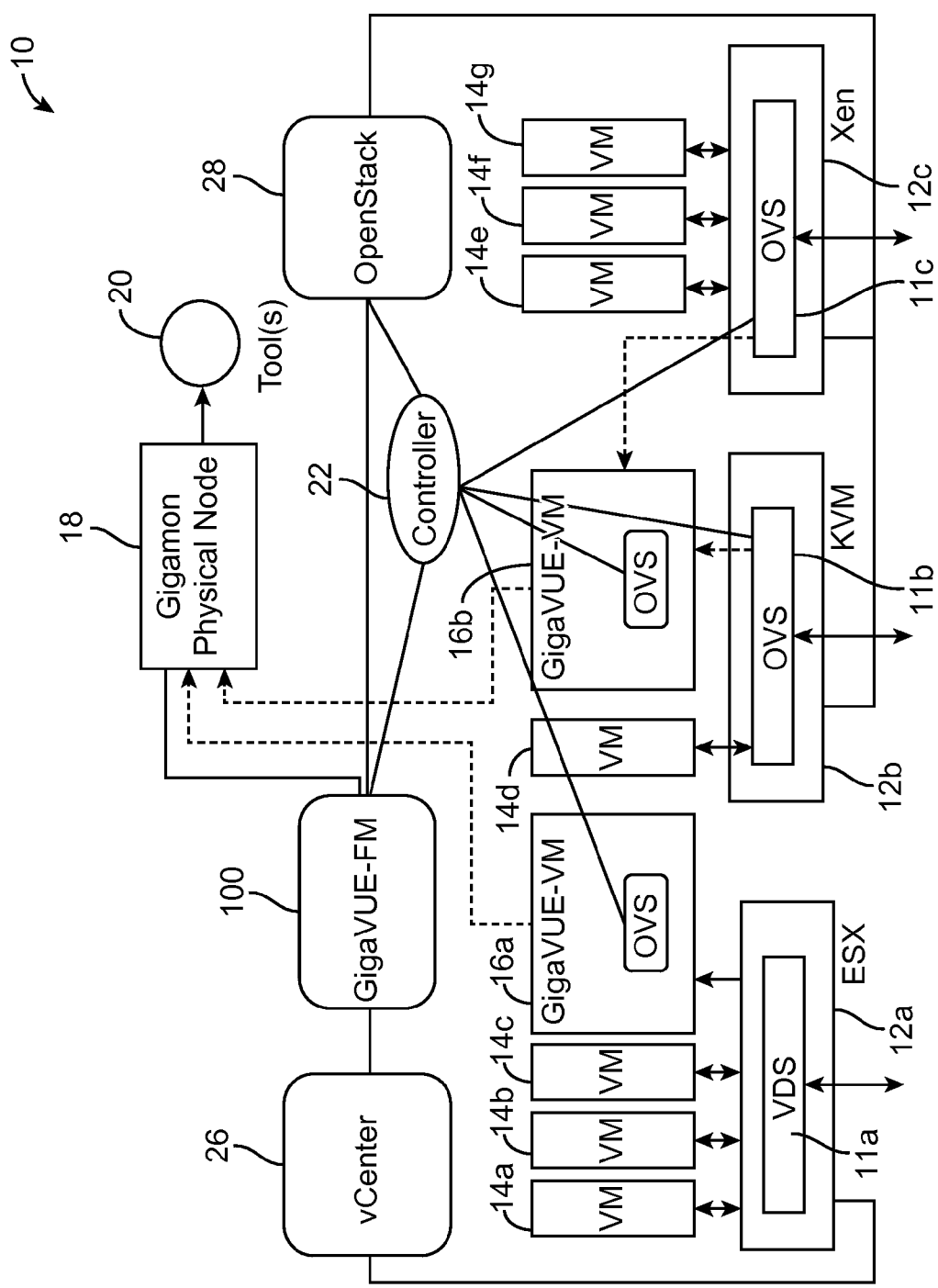
FIG. 2 illustrates another network in accordance with some embodiments.

It should be noted that the auxiliary network 10 is not limited to the example illustrated in FIG. 1, and that the auxiliary network 10 may have other configurations in other examples. For example, as shown in FIG. 2, the auxiliary network 10 may include multiple virtual switches 11a-11c at multiple hosts 12a-12c. The virtual switch 11a is not a part of the auxiliary network 10. The virtual switches 11b, 11c are parts of the auxiliary network 10, and therefore they may be considered service nodes P0. As shown in the figure, the host 12a supports VMs 14a-14c, the host 12b supports VM 14d, and the host 12c supports VMs 14e-14g. However, the VMs 14 are not parts of the auxiliary network. The network 10 may also include multiple VMs 16a, 16b. The VM 16a is associated with the host 12a, and the VM 16b is associated with the host 12b. Although one network device 18 is shown, in other examples, there may be multiple network devices 18, each of which configured to communicate with one or more tools 20.

FIG. 2 shows two examples of virtualization management layer (or infrastructure), one being vCenter 26 and the other being OpenStack 28. Although only one vCenter 26 and one openstack 28 are shown, in other examples, there may be multiple vCenters 26 and/or multiple openstacks 28. As shown in FIG. 2, there is a SDN controller 22, which communicates with various components in the network 10. The SDN controller 22 may communicate with virtual switch(es) 11 implemented at one or more of the hosts 12a, 12b, 12c, either directly, or indirectly through the vCenter 26 and/or the openstack 28. The SDN controller 22 may also communicate with the VMs 16a, 16b.

As discussed, the virtual switch 11, the VM 16, and the network device 18 are parts of an auxiliary network configured to obtain packets from a production network, and to pass packets to the tool(s) 20 for analysis. There are various paths for passing the packets downstream to the tool(s) 20. For example, in a first scenario, a packet may be transmitted by the virtual switch 11 to the VM 16, and then from the VM 16 to the network device 18. The network device 18 then passes the packet to the tool(s) 20. In a second scenario, a packet may be transmitted by the virtual switch 11 to the VM 16, and the VM 16 may then pass the packet directly to the tool(s) 20 without going through the network device 18. In a third scenario, the virtual switch 11 may pass the packet to the network device 18 without going through the VM 16, and the network device 18 then passes the packet to the tool(s) 20. In a fourth scenario, the virtual switch 11 may pass a packet directly to tool(s) 20 without going through the VM 16 and the network device 18.

In accordance with some embodiments, ATS may be implemented using the fabric manager 100. During use, a target selection module in the fabric manager 100 determines targets for a user based on a filter map of one or more filter rules provided by the user. A target in this context may be a VM, a vNIC, or any of other components having packets that are desired to be monitored.

B. Automatic Targets Selection

In some cases, for monitoring network traffic, a user may perform the following tasks for initiating a monitoring session: (1) identify targets desired to be monitored, (2) define filters, and (3) specify actions. A target in this context is a network component for which the network monitoring is performed. For example, if a user wants to monitor network traffic going to a certain target, then the user may identify such target in the monitoring session. By means of non-limiting examples, a target may be a VM, a vNIC, or any network component that is desired to be monitored.

The user-defined filters may be expressed as rules (filter rules) in a map (filter map). A rule may specify filter components (e.g., L1-L4) that are to be compared with packets to see if there is a match. A packet is considered as matching a rule if all of the filter components in the rule are met by the packet. In some cases a map may have one rule. In other cases, a map may have multiple rules.

The action specified by the user may be any action that is to be performed by one or more network components (e.g., by host 12, VM 16, network device 18, etc.) if a packet matches any rules in a map defined by the user. By means of non-limiting examples, an action may be any packet manipulation (e.g., tagging, truncation, etc.), packet forwarding (e.g., tunnel to a certain specified destination), etc. In some cases, the actions associated with a rule/map are executed whenever any rule in the map has a match. The search for a match may be performed sequentially or in parallel. Also, in some implementations, the search may be terminated after the first match. In addition, in some cases, the specified action(s) may be considered to be a part of the map.

The task performed by the user to identify every target that needs to be monitored may become tedious, especially when there is a very large number of potential targets. Also, such a task may need to be repeated every time a new map with multiple rules is created. In addition, if new targets of interest appear in the monitoring domain, they may need to be manually identified by the user, so that the user can associate the new targets with the map, before these new targets can be monitored. Accordingly, it may be desirable to provide an automatic target selection for the user. In some embodiments, such may be accomplished by the fabric manager 100 that automatically selects certain targets for a user.

In some cases, the fabric manager 100 providing the automatic target selection may be implemented using software that is run on a device. In such cases, the device running the automatic target selection software becomes a specialized device. By means of non-limiting examples, the device may be a computer, a laptop, a server, a tablet, an iPad, a phone, a network device, or any of other devices that is capable of performing communication.

Figure 3:
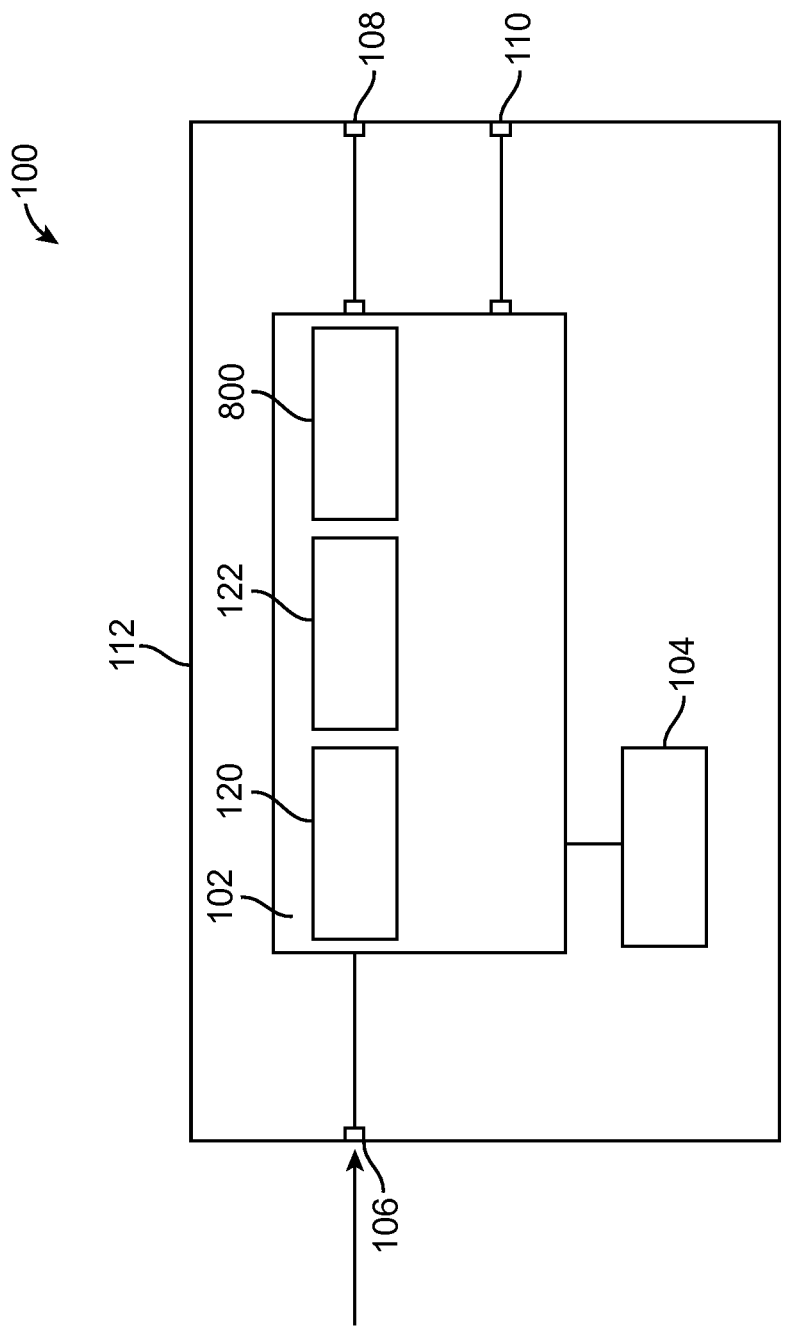
FIG. 3 illustrates a fabric manager that includes a target selection module in accordance with some embodiments.

FIG. 3 illustrates a fabric manager 100 that is configured to provide automatic target selection. As shown in the figure, the fabric manager 100 includes a processing unit 102 and a non-transitory medium 104 communicatively coupled to the processing unit 102. The fabric manager 100 also includes a communication interface 106 for receiving information from a user. In other cases, there may be multiple communication interfaces for receiving information from multiple users. The fabric manager 100 also includes a network interface 108 configured to communicate with a controller (e.g., the SDN controller 22), and a network interface 110 configured to communicate with a network device (e.g., the network device 18). Although only one network interface 108 and one network interface 110 are shown, in other examples, the fabric manager 100 may include multiple network interfaces 108 for communicating with multiple controllers 22, and/or multiple network interfaces 110 for communicating with multiple network devices 18. In other embodiments, two or more of the network interfaces 106, 108, 110 may be combined and be implemented as a single network interface. In the illustrated example, the processing unit 102 and the non-transitory medium 104 are accommodated in a housing 112 of the fabric manager 100. The housing 112 allows the fabric manager 100 to be carried, transported, sold, and/or operated as a single unit. Alternatively, the non-transitory medium 104 may be external to the housing 112. For example, the non-transitory medium 104 may be one or more storages/databases that are communicatively coupled to the processing unit 102. The network interfaces 106, 108, 110 are located at a periphery of the housing 112. In other embodiments, the network interfaces 106, 108, 110 may be located at other locations relative to the housing 112. In some cases, the fabric manager 100 may be integrated with a controller, such as the controller 22 (which may be a SDN controller in some embodiments).

The processing unit 102 may be implemented using an integrated circuit, such as a processor. A processor may be a general processor, a network processor, an ASIC processor, a FPGA processor, etc. In other embodiments, the processing unit 102 may be a field processor. In further embodiments, the processing unit 102 may be a network card. In some cases, the processing unit 102 may be implemented using hardware, software, or a combination of both.

As shown in the figure, the fabric manager 100 includes a user interface module 120, a target inventory accessing module 122, and a target selection module 800. The user interface module 120 is configured to provide a user interface for allowing a user of the fabric manager 100 to enter inputs. The inputs may be a filter map having one or more filter rules, wherein a filter rule may have one or more filtering components. The non-transitory medium 104 is configured to store the user-defined filter map.

The target inventory accessing module 122 is configured to access a list of available targets. In some embodiments, the identifiers of the available targets may be stored in a medium, e.g., the medium 104. In such cases, the target inventory accessing module 122 may be configured to communicate with the medium 104 for accessing the list of available targets. In the illustrated embodiments, the target inventory accessing module 122 is shown as a separate module from the target selection module 800. In other embodiments, the target inventory accessing module 122 may be implemented in, or as a part of, the target selection module 800.

The target selection module 800 is configured to automatically select certain targets for a user based on the inputs entered by the user. In the illustrated embodiments, the target selection module 800 is configured to infer targets to be monitored from the specified filter rule(s) defined by the user. The target selection module 800 operates on the idea that only those targets whose ingress/egress traffic can potentially result in a match with the user-defined filter rule(s) in a map need to be monitored (while the remaining targets may be ignored). The target selection process therefore involves deriving the set of all such targets for a given map.

In some cases, a user may define a set of filter rules that make up a map, with each filter rule having one or more filtering components. The target selection module 800 then searches all available targets in the inventory, and determines those that satisfy the filter rules for the given map.

In one implementation, the target selection module is configured to select the one or more targets from the list of available targets based on:

$$C = \begin{cases} \text{subset of } V \text{ associated with local } L1 - L3 \\ \text{filter component (if specified)} \\ V \end{cases},$$

$$R = \bigcap_{i=1}^{m} C_i,$$

and $$F = \bigcup_{j=1}^{n} R_j$$

wherein V represents the list of available targets.

As shown in the above algorithm, if the user does not define any filters, then the target selection module 800 may select the universal set V that includes all targets within the monitoring domain currently listed in the inventory as the set C of targets. If filter components are specified, the target selection module 800 then determines a subset of the universal set V of targets that satisfies the specified filter components.

Because a filter (rule) has m number of filter component (s), the target selection module 800 will determine a set R of target(s) that satisfies all of the filter component(s) in that filter rule (because all m number of filter component(s) in a filter rule must be satisfied simultaneously), as follows:

$$R = \bigcap_{i=1}^{m} C_i$$

Also, for a filter map that has n number of filter rule(s), the target selection module 800 will determine a set F of target(s) that includes any target that satisfies any of the n filter rule(s) (because a map is considered to have a match if any of its filters (filter rules) has a match) as follows:

$$F = \bigcup_{j=1}^{n} R_j.$$

In some cases, the user may have the option to guide the automatic target selection process, if desired. In particular, the user interface module 120 may be configured to provide a user interface for allowing a user of the fabric manager 100 to enter an inclusion set having targets that are to be included, and/or an exclusion set having targets that are to be excluded. The information regarding the inclusion set and/or the exclusion set may be stored in the medium 104. The inclusion set contains only those targets that should be considered by automatic target selection module 800. The user may define the inclusion set by identifying specific targets or by using an appropriate filter. Inclusion set(s) may be stored in the non-transitory medium 104 for later use. In one implementation, the inclusion set I may be defined as:

$$I = \begin{cases} \text{targets to be included (if specified)} \\ V(\text{otherwise}) \end{cases}$$

The exclusion set contains targets that should not be considered by automatic target selection module 800. The user may define the exclusion set by identifying specific targets or by using an appropriate filter. Exclusions set(s) may be stored in the non-transitory medium 104 for later use. In one implementation, an exclusion set E may be defined as:

$$E = \begin{cases} \text{targets to be excluded (if specified)} \\ \emptyset(\text{otherwise}) \end{cases}$$

The final target set T for a map may be based on the set of targets that satisfy the map, the inclusion set I, and the exclusion set E, as follow:

$$T = (F \cap I) - E.$$

In some cases, the processing unit 102 may be configured for: obtaining information regarding an inclusion set; and determining a second set of targets based on the information regarding the inclusion set. The processing unit may also include an inclusion set integrator configured to integrate information regarding an inclusion set in the process of determining the list of targets. In one implementation, the inclusion set integrator is configured to provide a "∩" (intersection) function and to determine the set of one or more targets based on: (the first set of targets in set F)∩(the second set of targets from the inclusion set).

Also, in some cases, the processing unit 102 may be configured for: obtaining information regarding an exclusion set; and determining a third set of targets based on the information regarding the exclusion set. The processing unit may also include an exclusion set integrator configured integrate information regarding an exclusion set in the process of determining the list of target. In one implementation, the exclusion set integrator is configured to provide a "−" (difference) function. The inclusion set and exclusion set integrators are configured to determine the set of one or more targets based on: ((the first set of targets in set F)∩(the second set of targets form the inclusion set))−(the third set of targets from the exclusion set).

Figure 4:
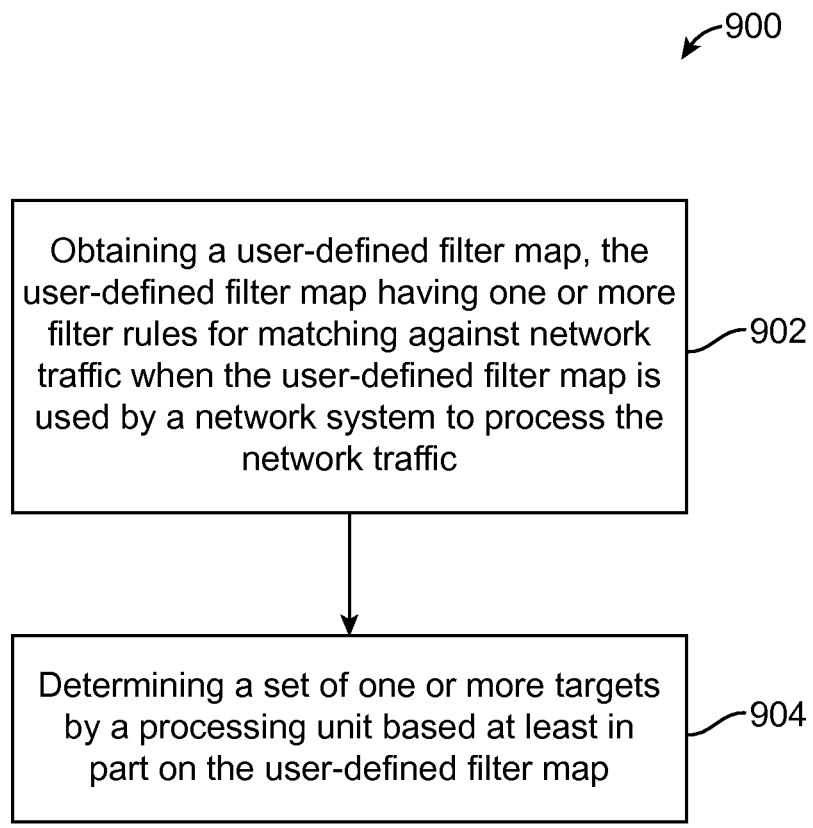
FIG. 4 illustrates a method of identifying targets for a network system.

FIG. 4 illustrates a method 900 of identifying targets for monitoring. The method 900 may be performed by the processing unit 102 of FIG. 3. First, a user-defined filter map is obtained (item 902). The user-defined filter map may have one or more filter rules for matching against network traffic when the user-defined filter map is used by a network system to process the network traffic. A filter rule may have one or more filter component(s). For example, a filter component may be a L1 filter component (e.g., switch port), a L2 filter component (e.g., MAC address, VLAN identifier, ethertype, etc.), a L3 filter component (e.g., IP address), or any combination of the foregoing. Thus, a filter component may include information regarding switch port, MAC address, VLAN identifier, ethertype, IP address, or any combination of the foregoing. In some cases, only local L1-L3 filter components are considered when looking for potential targets because remote filter components may not be associated with a desired monitoring domain (e.g., a local monitoring domain). In some cases, item 902 may be performed by the processing unit 102 retrieving a map having one or more user-defined filter rules stored in a non-transitory medium (e.g., the medium 104). In other cases, item 902 may be performed by the processing unit 102 receiving an input from a user that defines one or more filters in a map.

Next, a set of one or more targets is determined by the processing unit 102 based at least in part on the user-defined filter map (item 904). In some cases, the processing unit 102 is configured to access a list of available targets from a database, and select the one or more targets from the list of available targets based at least in part on the user-defined filter map. The database may be a medium in the fabric manager 100 or one or more media that is communicatively coupled to the fabric manager 100. Also, in some embodiments, item 904 may be performed before the network system uses the user-defined filter map to process the network traffic.

In some cases, the act of determining the set of one or more targets comprises determining a first set of targets by the processing unit 102 that are possible source(s) and/or recipient(s) of packets satisfying the user-defined filter map. For example, the user-defined filter map includes a first filter rule having first multiple filter components, and wherein the act of determining the set of one or more targets comprises determining a first set R1 of targets by the processing unit 102 that are possible source(s) and/or recipient(s) of packets satisfying all of the first multiple filter components of the first filter rule. The user-defined filter map may include a second filter rule having second multiple filter components, and wherein the act of determining the set of one or more targets further comprises determining a second set R2 of targets by the processing unit 102 that are possible source(s) and/or recipient(s) of packets satisfying all of the second multiple filter components of the second filter rule. The filter set F of targets can be determined based on $$F = \bigcup_{j=1}^{n} R_j$$

which is R1∩R2 (i.e., union of R1 and R2) in the above example.

In some cases, the method 900 may further include obtaining information regarding an inclusion set, and determining a second set of targets based on the information regarding the inclusion set, wherein the set of one or more targets is determined based on: (the first set of targets from set F)∩(the second set of targets from the inclusion set).

Also, in some cases, the method 900 may further include obtaining information regarding an exclusion set, and determining a third set of targets based on the information regarding the exclusion set, wherein the set of one or more targets is determined based on: ((the first set of targets from set F)∩(the second set of targets from the inclusion set))−(the third set of targets from the exclusion set).

In some cases, the obtained user-defined filter map comprises a newly created filter rule, and the act of determining the set of one or more targets is performed by the processing unit 102 in response to the newly created filter rule. Also, in some cases, the obtained user-defined filter map comprises a modified filter rule resulted from a modification of an existing filter rule, and the act of determining the set of one or more targets is performed by the processing unit 102 in response to the modified filter rule. In some embodiments, the processing unit may include a detection module for detecting the newly created filter rule and/or the modified filter rule.

Figure 5:
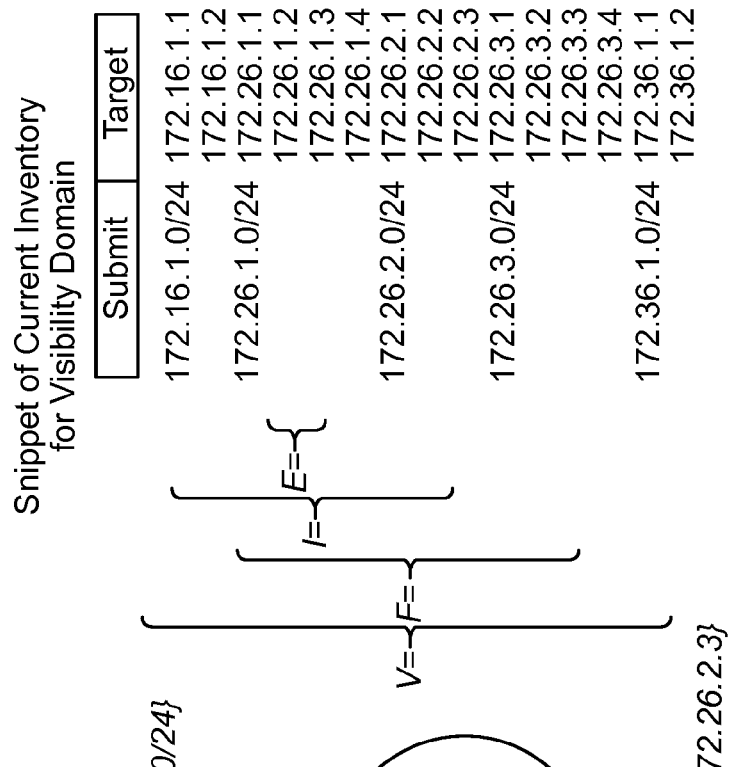
FIG. 5 illustrates an example of automatic target selection.
Figure 5:
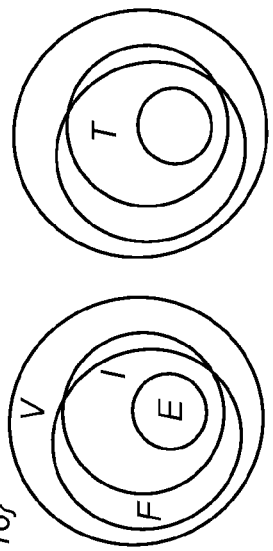

FIG. 5 illustrates an example of the automatic target selection technique described. In the illustrated example, the user has defined two filters: "IP_src=172.26.0.0/16, IP_dst=*" and "IP_src=*, IP_dst=172.26.0.0/16" corresponding to bi-directional network traffic direction. These filters are for capturing packets that travel to, or travel from, certain target(s). In the above filter definitions, a "0" in the filter component denotes a wildcard. So, "172.26.0.0/16" will cover any of the targets 172.26.1.0, 172.26.2.0, . . . 172.26.9.0 to the extent that they are available in the inventory. In the illustrated example, the user has also defined an inclusion set I to be I=(172.16.1.0/24, 172.26.1.0/24, 172.26.2.0/24), and an exclusion set E to be E=(172.26.1.2, 172.26.1.3). The above user inputs may entered using the interface provided by the user interface module 120, and may be stored in the non-transitory medium 104 of the fabric manager 100.

As shown in FIG. 5, all available targets in an inventory may be represented as V=(172.0.0.0/8). In some cases, the inventory of targets may be created and updated automatically in response to a user adding, removing, and/or relocating a target. For example, a new vNIC may be added to the network, and the VM (e.g., VM 16) and/or the host (e.g., host 12) associated with the newly added vNIC may contain information regarding the new vNIC. In some cases, the fabric manager 100 may be configured to periodically communicate with the VM and/or the host to see if there is any change to the targets. If a target is added, is removed, or relocated, the fabric manager 100 then updates the targets inventory accordingly. In other cases, the VM 16, the host 12, or a controller coupled to the host 12, may be configured to automatically inform the fabric manager 100 if there is any change to the target(s), and the fabric manager 100 will automatically update the targets inventory accordingly.

In the illustrated example, among all of the available targets in the V set, only a subset F of targets satisfies the two user-defined filters. In the illustrated example, the processing unit 102 of the fabric manager 100 determines that the targets in the subset F satisfying the two user-defined filters include 172.26.1.0/24, 172.26.2.0/24, and 172.26.3.0/24. However, because the inclusion set I defined by the user does not include 172.26.3.0/24, only 172.26.1.0/24 and 172.26.2.0/24 are included based on F∩I, and the remaining set includes 172.26.1.0/24 (which covers 172.26.1.1, 172.26.1.2, 172.26.1.3, 172.26.1.4 in the inventory) and 172.26.2.0/24 (which covers 172.26.2.1, 172.26.2.2, 172.26.2.3 in the inventory). Also, because the exclusion set E defined by the user includes 172.26.1.2 and 172.26.1.3, these two targets are excluded based on (F∩I)−E. The final target set T includes only 172.26.1.1, 172.26.1.4, 172.26.2.1, 172.26.2.2, and 172.26.2.3.

As shown in the above examples, the target selection module 800 is advantageous because it provides a fully automated selection of the relevant targets that need to be monitored. The target selection module 800 also allows the user to guide the selection process so that the target selection may be semi-automatic. The target selection process ensures that only the relevant targets (whose ingress/egress network traffic can potentially match rules in the map) are selected for monitoring. The target selection module 800 is also advantageous because it allows detection of new targets and modifications to existing targets, and may update the set of selected targets accordingly. For example, if the target selection module 800 determines that a newly added target satisfies a user-defined map, and the inclusion set I and the exclusion set E defined by the user, the target selection module 800 may automatically update the set of selected targets to include the newly added target. As another example, if a previous target has been removed, the target selection module 800 may detect such removal of the target, and may automatically update the set of selected targets determined previously. In some cases, any change in the inventory of targets (e.g., addition of a new target, removal of a previous target, etc.) may trigger the target selection module 800 to update the set of selected targets determined previously. Also, in some cases in which the user supplied inclusion and exclusion sets are incompatible with the target set derived from the user-defined map, the fabric manager 100 may flag a warning. In the manual target selection technique, such incompatibilities cannot be easily detected.

Specialized Processing System Architecture

Figure 6:
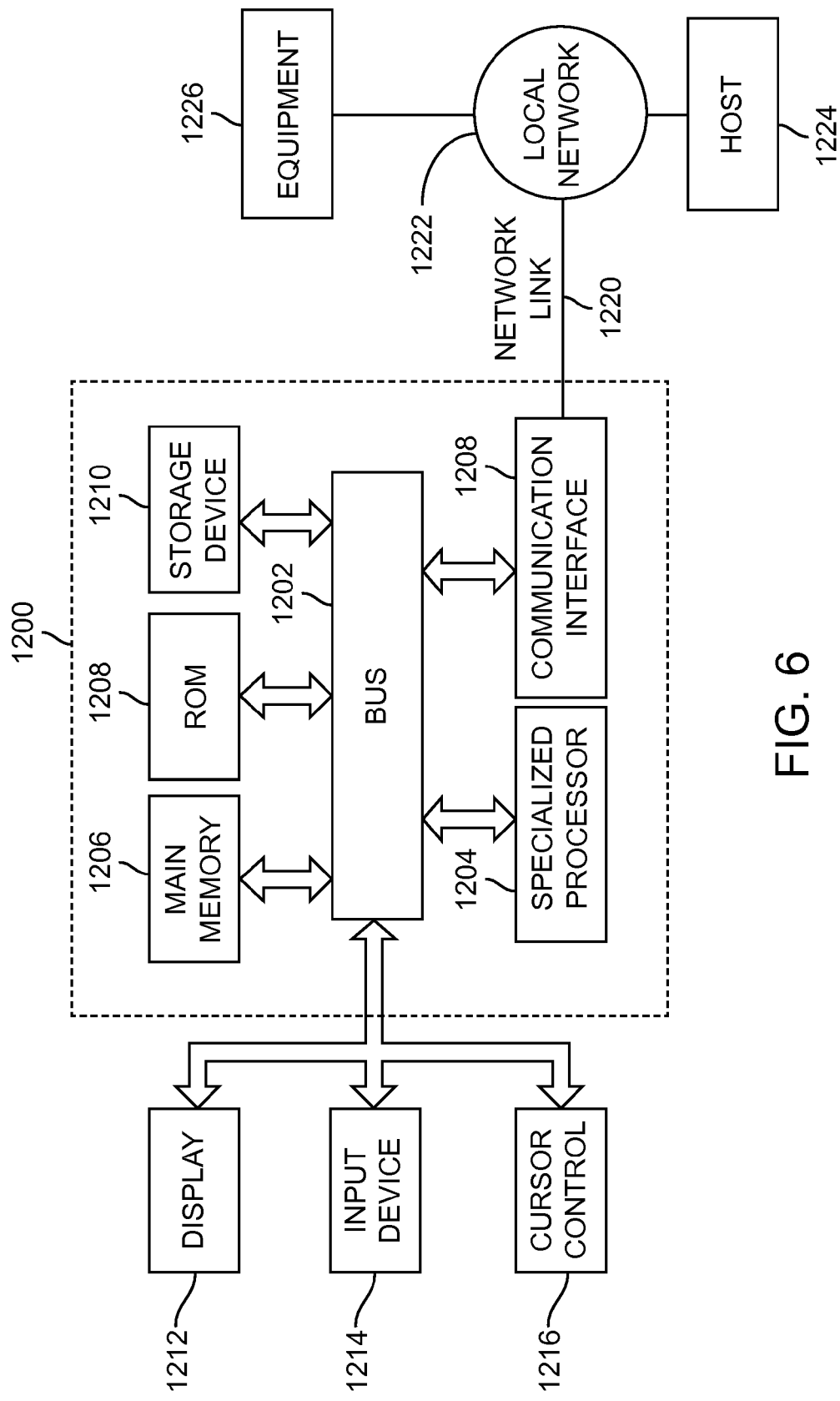
FIG. 6 illustrates a specialized processing system with which embodiments described herein may be implemented.

FIG. 6 is a block diagram that illustrates an embodiment of a specialized processing system 1200 upon which embodiments described herein may be implemented. For example, in some embodiments, the specialized processing system 1200 may be used to implement one or more functions of the processing unit 102, or one or more functions of the fabric manager 100 described herein. Processing system 1200 includes a bus 1202 or other communication mechanism for communicating information, and a processor 1204 coupled with the bus 1202 for processing information. The processor 1204 may be used to perform various functions described herein. For examples, the processor 1204 may be a specialized processor having a target selection module. Accordingly, the processor 1204 may be a target selection processing unit.

The processing system 1200 also includes a main memory 1206, such as a random access memory (RAM) or other dynamic storage device, coupled to the bus 1202 for storing information and instructions to be executed by the processor 1204. The main memory 1206 also may be used for storing temporary variables or other intermediate information during execution of instructions to be executed by the processor 1204. The processing system 1200 further includes a read only memory (ROM) 1208 or other static storage device coupled to the bus 1202 for storing static information and instructions for the processor 1204. A data storage device 1210, such as a magnetic disk or optical disk, is provided and coupled to the bus 1202 for storing information and instructions.

The processing system 1200 may be coupled via the bus 1202 to a display 1212, such as a cathode ray tube (CRT) or a LCD monitor, for displaying information to a user. An input device 1214, including alphanumeric and other keys, is coupled to the bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The processing system 1200 may be used for performing various functions in accordance with the embodiments described herein. According to one embodiment, such use is provided by processing system 1200 in response to processor 1204 executing one or more sequences of one or more instructions contained in the main memory 1206. Such instructions may be read into the main memory 1206 from another processor-readable medium, such as storage device 1210. Execution of the sequences of instructions contained in the main memory 1206 causes the processor 1204 to perform the process steps described herein. One or more processors in a multi-processing arrangement may also be employed to execute the sequences of instructions contained in the main memory 1206. In alternative embodiments, hard-wired circuitry may be used in place of or in combination with software instructions to implement features of the embodiments described herein. Thus, embodiments described herein are not limited to any specific combination of hardware circuitry and software.

The term "processor-readable medium" as used herein refers to any medium that participates in providing instructions to the processor 1204 for execution. Such a medium may take many forms, including but not limited to, non-volatile media, volatile media, and transmission media. Non-volatile media includes, for example, optical or magnetic disks, such as the storage device 1210. A non-volatile medium may be considered to be an example of a non-transitory medium. Volatile media includes dynamic memory, such as the main memory 1206. A volatile medium may be considered to be another example of a non-transitory medium. Transmission media includes coaxial cables, copper wire and fiber optics, including the wires that comprise the bus 1202. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to the processor 1204 for execution. For example, the instructions may initially be carried on a magnetic disk of a remote computer. The remote computer can load the instructions into its dynamic memory and send the instructions over a telephone line using a modem. A modem local to the processing system 1200 can receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1206, from which the processor 1204 retrieves and executes the instructions. The instructions received by the main memory 1206 may optionally be stored on the storage device 1210 either before or after execution by the processor 1204.

The processing system 1200 also includes a communication interface 1218 coupled to the bus 1202. The communication interface 1218 provides a two-way data communication coupling to a network link 1220 that is connected to a local network 1222. For example, the communication interface 1218 may be an integrated services digital network (ISDN) card or a modem to provide a data communication connection to a corresponding type of telephone line. As another example, the communication interface 1218 may be a local area network (LAN) card to provide a data communication connection to a compatible LAN. Wireless links may also be implemented. In any such implementation, the communication interface 1218 sends and receives electrical, electromagnetic or optical signals that carry data streams representing various types of information.

The network link 1220 typically provides data communication through one or more networks to other devices. For example, the network link 1220 may provide a connection through local network 1222 to a host computer 1224 or to equipment 1226 such as a radiation beam source or a switch operatively coupled to a radiation beam source. The data streams transported over the network link 1220 can comprise electrical, electromagnetic or optical signals. The signals through the various networks and the signals on the network link 1220 and through the communication interface 1218, which carry data to and from the processing system 1200, are exemplary forms of carrier waves transporting the information. The processing system 1200 can send messages and receive data, including program code, through the network(s), the network link 1220, and the communication interface 1218.

It should be noted that when a "packet" is described in this application, it should be understood that it may refer to the original packet that is transmitted from a node, or a copy of it.

It should be noted that the terms "first", "second", etc., are used to refer to different things, and do not necessarily refer to the order of things.

Although particular embodiments have been shown and described, it will be understood that they are not intended to limit the claimed inventions, and it will be obvious to those skilled in the art that various changes and modifications may be made without departing from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A method of identifying targets for monitoring, comprising:
    obtaining a user-defined filter map, the user-defined filter map having one or more filter rules for matching against network traffic when the user-defined filter map is used by a network system to process the network traffic; and
    determining a set of one or more targets by a processing unit based at least in part on the user-defined filter map, wherein the processing unit comprises a target selection module configured to access a list of available targets from a database, and select the one or more targets from the list of available targets based at least in part on the user-defined filter map, wherein the target selection module is configured to select the one or more targets from the list of available targets based on:

$$C = \begin{cases} \text{subset of } V \text{ associated with one or more filter components or} \\ V \end{cases},$$

$$R = \bigcap_{i=1}^{m} C_i,$$

and $$F = \bigcup_{j=1}^{n} R_j$$

wherein V represents the list of available targets.

2. The method of claim 1, wherein the target selection module is configured to select the one or more targets from the list of available targets also based on an inclusion set I defined as:

$$I = \begin{cases} \text{targets to be included (if specified)} \\ V(\text{otherwise}) \end{cases}.$$

3. The method of claim 2, wherein the target selection module is configured to select the one or more targets from the list of available targets also based on an exclusion set E defined as:

$$E = \begin{cases} \text{targets to be excluded (if specified)} \\ \emptyset(\text{otherwise}) \end{cases}.$$

4. The method of claim 3, wherein the one or more targets constitute a target set T defined as T=(F I)−E.

5. The method of claim 1, wherein the targets comprise a virtual machine (VM).

6. The method of claim 1, wherein the targets comprise a virtualized Network Interface Card (vNIC).

7. The method of claim 1, wherein the act of determining the set of one or more targets comprises determining a first set of targets that are at least one possible source(s) or recipient(s) of packets satisfying any of the one or more filter rules in the user-defined filter map.

8. The method of claim 1, wherein the user-defined filter map comprises a first filter rule having first multiple filter components, and wherein the act of determining the set of one or more targets comprises determining a first set of targets by the processing unit that are at least one of possible source(s) or recipient(s) of packets satisfying all of the first multiple filter components of the first filter rule.

9. The method of claim 8, wherein the user-defined filter map comprises a second filter rule having second multiple filter components, and wherein the act of determining the set of one or more targets further comprises determining a second set of targets by the processing unit that are at least one of possible source(s) or recipient(s) of packets satisfying all of the second multiple filter components of the second filter rule.

10. The method of claim 1, wherein the obtained user-defined filter map comprises a newly created filter rule, and the act of determining the set of one or more targets is performed by the processing unit in response to the newly created filter rule.

11. The method of claim 1, wherein the obtained user-defined filter map comprises a modified filter rule resulted from a modification of an existing filter rule, and the act of determining the set of one or more targets is performed by the processing unit in response to the modified filter rule.

12. The method of claim 1, wherein one of the one or more filter rules comprises one or more filter components, the one or more filter components comprising information regarding a switch port, a media access control (MAC) address, a virtual local area network (VLAN) identifier, an ethertype, an Internet protocol (IP) address, a wildcard, or any combination of the foregoing.

13. A method identifying targets for monitoring, comprising:
    obtaining a user-defined filter map, the user-defined filter map having one or more filter rules for matching against network traffic when the user-defined filter map is used by a network system to process the network traffic;
    determining a set of one or more targets by a processing unit based at least in part on the user-defined filter map, wherein the processing unit comprises a target selection module configured to access a list of available targets from a database, and select the one or more targets from the list of available targets based at least in part on the user-defined filter map, wherein the act of determining the set of one or more targets comprises determining a first set of targets that are at least one of possible source(s) or recipient(s) of packets satisfying any of the one or more filter rules in the user-defined filter map;
    obtaining information regarding an inclusion set; and determining a second set of targets based on the information regarding the inclusion set;
wherein the set of one or more targets is determined based on: (the first set of targets)∩(the second set of targets).

14. The method of claim 13, further comprising:
obtaining information regarding an exclusion set; and
determining a third set of targets based on the information regarding the exclusion set;
wherein the set of one or more targets is determined based on: ((the first set of targets)∩(the second set of targets))−(the third set of targets).

15. An apparatus for identifying targets for monitoring, comprising:
a non-transitory medium for storing a user-defined filter map, the user-defined filter map having one or more filter rules for matching against network traffic when the user-defined filter map is used by a network system to process the network traffic;
a processing unit configured for determining a set of one or more targets based at least in part on the user-defined filter map;
wherein the processing unit comprises a target selection module configured to determine the set of one or more targets by accessing a list of available targets from a database, and selecting the one or more targets from the list of available targets based at least in part on the user-defined filter map, wherein the target selection module is configured to select the one or more targets from the list of available targets based on:

$$C = \begin{cases} \text{subset of } V \text{ associated with one or more filter components or} \\ V \end{cases},$$

$$R = \bigcap_{i=1}^{m} C_i,$$

and $$F = \bigcup_{j=1}^{n} R_j$$

wherein V represents the list of available targets.

16. The apparatus of claim 15, wherein the target selection module is configured to select the one or more targets from the list of available targets also based on an inclusion set I defined as:

$$I = \begin{cases} \text{targets to be included (if specified)} \\ V (\text{otherwise}) \end{cases}.$$

17. The apparatus of claim 16, wherein the target selection module is configured to select the one or more targets from the list of available targets also based on an exclusion set E defined as:

$$E = \begin{cases} \text{targets to be excluded (if specified)} \\ \emptyset (\text{otherwise}) \end{cases}.$$

18. The apparatus of claim 17, wherein the one or more targets constitute a target set T defined as T=(F I)−E.

19. The apparatus of claim 15, wherein the targets comprise a virtual machine (VM).

20. The apparatus of claim 15, wherein the targets comprise a virtualized Network Interface Card (vNIC).

21. The apparatus of claim 15, wherein the processing unit is configured for determining the set of one or more targets by determining a first set of targets that are at least one possible source(s) or recipient(s) of packets satisfying any of the one or more filter rules in the user-defined filter map.

22. The apparatus of claim 15, wherein the user-defined filter map comprises a first filter rule having first multiple filter components, and wherein the processing unit is configured for determining the set of one or more targets by determining a first set of targets by the processing unit that are at least one of possible source(s) or recipient(s) of packets satisfying all of the first multiple filter components of the first filter rule.

23. The apparatus of claim 22, wherein the user-defined filter map comprises a second filter rule having second multiple filter components, and wherein the processing unit is configured for determining the set of one or more targets further by determining a second set of targets by the processing unit that are at least one of possible source(s) or recipient(s) of packets satisfying all of the second multiple filter components of the second filter rule.

24. The apparatus of claim 15, wherein the obtained user-defined filter map comprises a newly created filter rule, and the processing unit is configure for determining the set of one or more targets in response to the newly created filter rule.

25. The apparatus of claim 15, wherein the obtained user-defined filter map comprises a modified filter rule resulted from a modification of an existing filter rule, and the processing unit is configured for determining the set of one or more targets in response to the modified filter rule.

26. The apparatus of claim 15, wherein one of the one or more filter rules comprises one or more filter components, the one or more filter components comprising information regarding a switch port, a media access control (MAC) address, a virtual local area network (VLAN) identifier, an ethertype, an Internet protocol (IP) address, a wildcard, or any combination of the foregoing.

27. The apparatus for identifying targets for monitoring, comprising:
a non-transitory medium for storing a user-defined filter map, the user-defined filter map having one or more filter rules for matching against network traffic when the user-defined filter map is used by a network system to process the network traffic;
a processing unit configured for determining a set of one or more targets based at least in part on the user-defined filter map and determining the set of one or more targets by determining a first set of targets that are at least one of possible source(s) or recipient(s) of packets satisfying any of the one or more filter rules in the user-defined filter map;
wherein the processing unit comprises a target selection module configured to determine the set of one or more targets by accessing a list of available targets from a database, and selecting the one or more targets from the list of available targets based at least in part on the user-defined filter map;
obtaining information regarding an inclusion set; and
determining a second set of targets based on the information regarding the inclusion set;

wherein the processing unit is configured to determine the set of one or more targets based on: (the first set of targets)∩(the second set of targets).

28. The apparatus of claim 27, wherein the processing unit is further configured for:

obtaining information regarding an exclusion set; and determining a third set of targets based on the information regarding the exclusion set;

wherein the processing unit is configured to determine the set of one or more targets based on: ((the first set of targets)∩(the second set of targets))−(the third set of targets).

* * * * *